(12) United States Patent
Tsumura et al.

(10) Patent No.: US 7,920,133 B2
(45) Date of Patent: Apr. 5, 2011

(54) ACOUSTIC WAVE TYPE TOUCH PANEL

(75) Inventors: Masahiro Tsumura, Kanagawa (JP); Noriko Fujita, Kanagawa (JP)

(73) Assignee: Touch Panel Systems K.K. (JP)

( * ) Notice: Subject to any disclaimer, the term of this patent is extended or adjusted under 35 U.S.C. 154(b) by 648 days.

(21) Appl. No.: 11/755,174

(22) Filed: May 30, 2007

(65) Prior Publication Data
US 2007/0279398 A1 Dec. 6, 2007

(30) Foreign Application Priority Data

May 31, 2006 (JP) ................................ 2006-151608

(51) Int. Cl.
*G06F 3/43* (2006.01)
(52) U.S. Cl. ..................................................... 345/177
(58) Field of Classification Search ............... 345/94, 345/173, 177, 208, 50, 104, 179, 204; 422/100; 315/312; 369/44.12; 178/18.09
See application file for complete search history.

(56) References Cited

U.S. PATENT DOCUMENTS

| | | | | |
|---|---|---|---|---|
| 4,645,870 A | * | 2/1987 | Adler | 345/177 |
| 4,700,176 A | | 10/1987 | Adler | |
| 5,835,458 A | * | 11/1998 | Bischel et al. | 369/44.12 |
| 6,639,733 B2 | * | 10/2003 | Minano et al. | 359/728 |
| 7,204,148 B2 | | 4/2007 | Tanaka et al. | |
| 7,513,670 B2 | * | 4/2009 | Yang et al. | 362/609 |
| 7,562,991 B2 | * | 7/2009 | Benson et al. | 359/530 |
| 2002/0176804 A1 | * | 11/2002 | Strand et al. | 422/100 |
| 2003/0146673 A1 | | 8/2003 | Toda et al. | |
| 2003/0164820 A1 | | 9/2003 | Kent | |
| 2004/0263492 A1 | * | 12/2004 | Chao et al. | 345/177 |
| 2005/0035685 A1 | * | 2/2005 | Tanaka et al. | 310/313 D |
| 2005/0156911 A1 | * | 7/2005 | Tanaka et al. | 345/177 |
| 2005/0243071 A1 | * | 11/2005 | Kent et al. | 345/177 |
| 2006/0056166 A1 | * | 3/2006 | Yeo et al. | 362/19 |
| 2006/0291244 A1 | * | 12/2006 | Yang et al. | 362/609 |
| 2007/0122314 A1 | * | 5/2007 | Strand et al. | 422/100 |
| 2007/0145915 A1 | * | 6/2007 | Roberge et al. | 315/312 |

FOREIGN PATENT DOCUMENTS

EP 0190734 A1 8/1986

OTHER PUBLICATIONS

European Search Report for EP07109011 (counterpart for U.S. Appl. No. 11/755,174).

* cited by examiner

*Primary Examiner* — Prabodh M Dharia

(57) ABSTRACT

An acoustic wave type touch panel is equipped with: a substrate that objects contact; reflective arrays having a great number of inclined lines provided on the substrate; acoustic wave generating sections provided on the substrate; and detecting sections provided on the substrate. An array of micro reflectors, which are shorter than the inclined lines, for attenuating spurious waves generated by reflection of the acoustic waves by the reflective arrays, is provided in the reflective array regions between the inclined lines at least one end thereof.

20 Claims, 4 Drawing Sheets

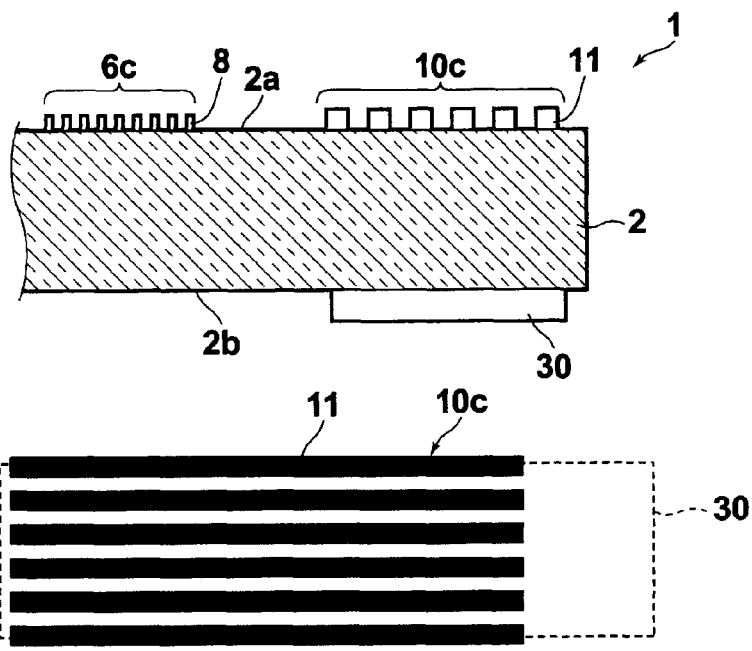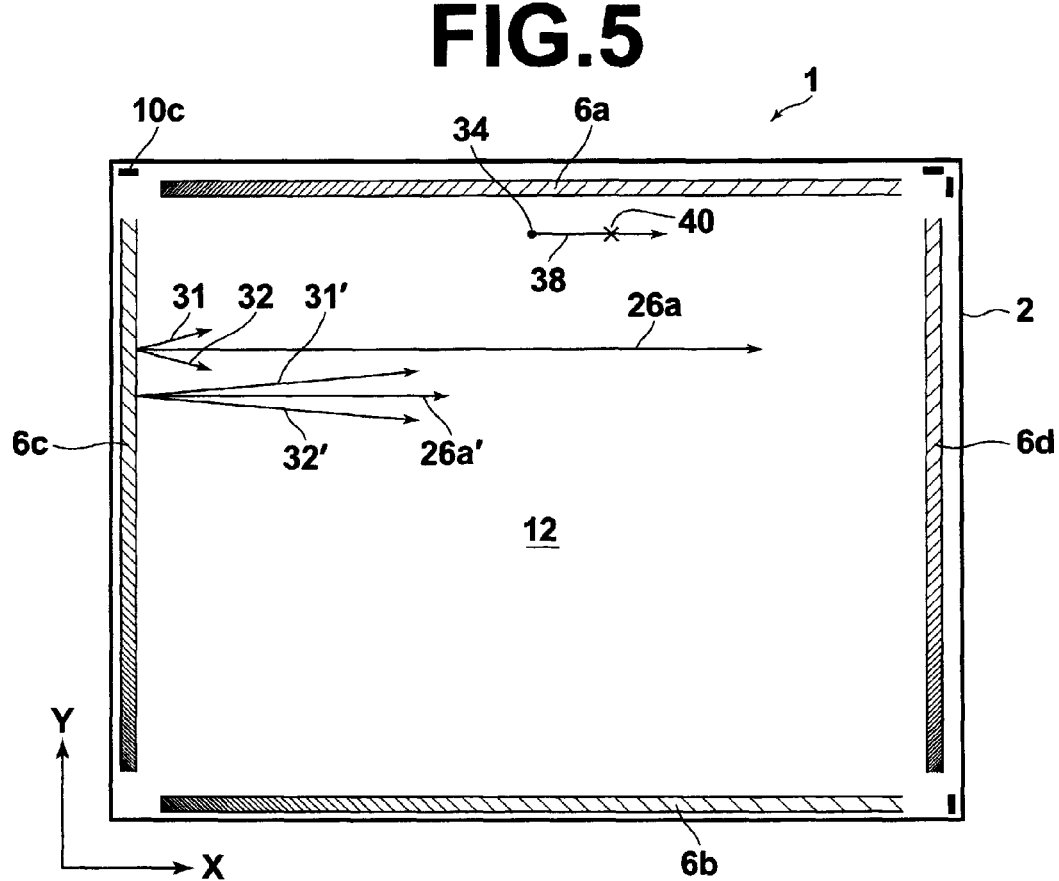

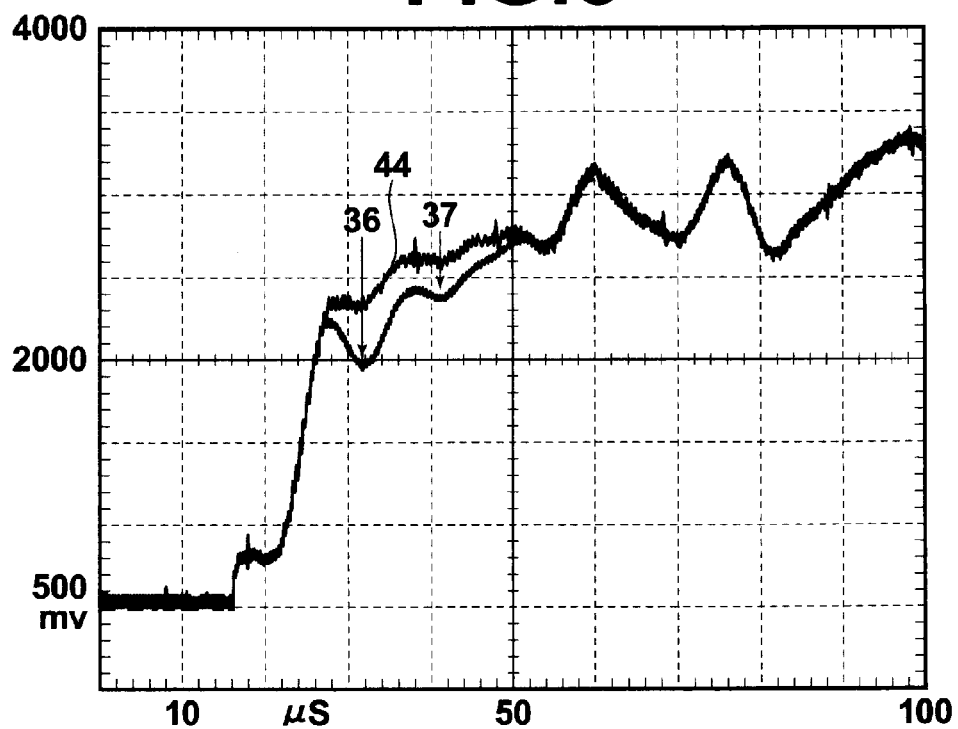
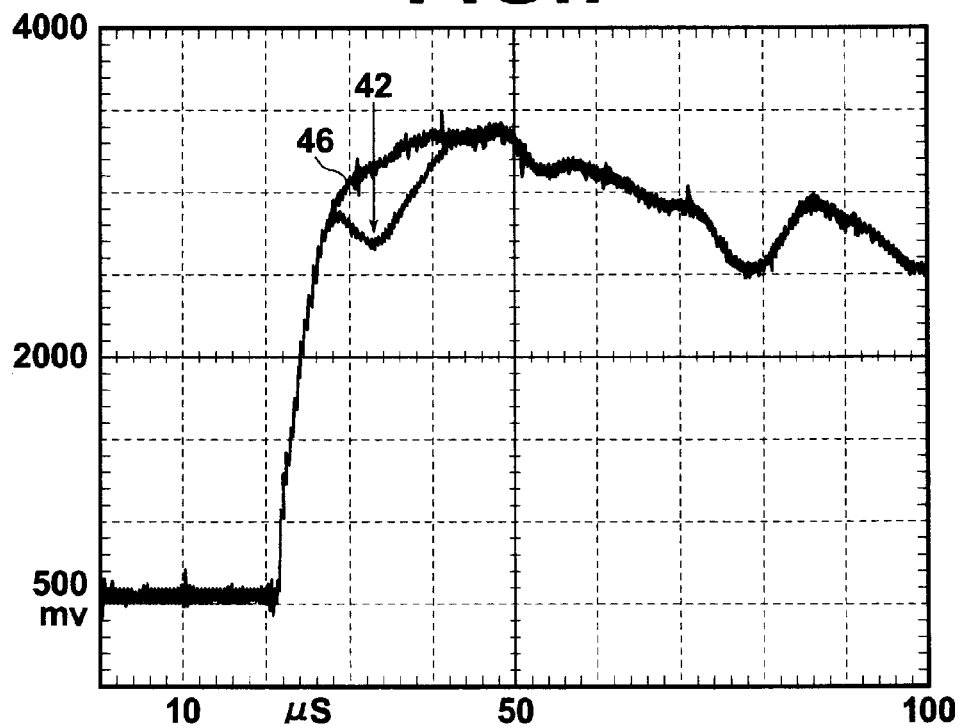

United States Patent US 7,920,133 B2

ACOUSTIC WAVE TYPE TOUCH PANEL

CROSS-REFERENCE TO RELATED APPLICATIONS

This application claims the benefit of the filing date under 35 U.S.C. §119(a)-(d) of Japanese Patent Application No. 2006-151608, filed May 31, 2006.

FIELD OF THE INVENTION

The present invention relates to a touch panel, which is utilized to detect contact positions of objects (pointers) such as a finger that contact a substrate. The present invention relates particularly to an acoustic wave type touch panel that detects contact positions objects (pointers), employing ultrasonic waves that propagate along the surface of the substrate, that is, surface acoustic waves.

BACKGROUND

Ultrasonic acoustic wave type touch panels are in widespread use. Examples of their applications include operating screens of personal computers, ticket vending machines at train stations, copiers installed in convenience stores, and ATM's at financial institutions. These acoustic wave type touch panels utilize transducers (converters), including piezoelectric elements provided on a substrate formed of glass or the like. These transducers function both as generating means for acoustic waves and as sensors for detecting acoustic waves which are scattered by a finger or the like that contacts the touch panel.

The basic principle of acoustic wave touch panels is as follows. Ultrasonic vibrations, which are generated by transmitting side transducers as bulk waves, are converted to surface acoustic waves by mode converting elements, and are caused to propagate along the surface of the substrate. The transducers and reflective arrays are generally provided such that the surface acoustic waves propagate in the X axis direction and the Y axis direction of the substrate such that they intersect with each other. When the surface acoustic waves are blocked by a finger or the like along the paths thereof, the paths are blocked, and the surface acoustic waves are scattered. When the surface acoustic waves, of which the intensity has been reduced due to the scattering, enters receiving side transducers, they are detected as electric signals. The detected electric signals are referenced against clock signals of a controller separate from the touch panel, and the position at which the surface acoustic waves are blocked is determined.

However, when the bulk waves are converted to surface acoustic waves by the mode converting elements, not all of the bulk waves are converted into surface acoustic waves that propagate in predetermined directions. In addition, surface acoustic waves which are reflected by the reflective arrays are not necessarily reflected in the predetermined directions. These surface acoustic waves that do not propagate in the predetermined directions become so-called "spurious waves". If these spurious waves propagate while being reflected along the substrate and reach the receiving side transducers, they cause the receiving side transducers to vibrate and generate voltages. These voltages are received as noise, and throw off proper judgment by the controller.

Various measures have been proposed to alleviate this problem, which is caused by the spurious waves. For example, providing vibration insulating or vibration absorbing materials on a substrate to absorb the generated spurious waves has been disclosed in European Patent Publication No. 0190734 (refer to page 11 and FIG. 2). Ultrasonic waves generated by transducers are emitted toward reflective arrays, but these ultrasonic waves include components that propagate in directions opposite the reflective arrays. The vibration absorbing materials are provided to attenuate the energy of these components. Spurious surface acoustic waves that propagate in directions opposite the reflective arrays are attenuated by the vibration absorbing materials, and prevent scattered reflection into a touch region.

As another example, U.S. Patent Application Publication No. 20030146673 discloses a touch panel having elastic material for absorbing surface acoustic waves provided on a substrate of the touch panel (refer to page 3, FIG. 2, and FIG. 3). This touch panel does not have any reflective arrays, and instead is equipped with transmitting side piezoelectric elements and receiving side piezoelectric elements that face each other across the substrate. The elastic material is provided closer to the edge of the substrate than the transmitting side piezoelectric elements and closer to the edge of the substrate than the receiving side piezoelectric elements. Thereby, acoustic waves that propagate from the transmitting side piezoelectric elements toward the edge of the substrate opposite the receiving side piezoelectric elements are attenuated. In addition, acoustic waves that have reached the receiving side piezoelectric elements from the transmitting side piezoelectric elements are attenuated after passing through the receiving side piezoelectric elements. Therefore, the acoustic waves are prevented from being reflected by the edge of the substrate to reenter the receiving side piezoelectric elements. Interference between predetermined functional acoustic waves which are to be utilized and spurious waves can be prevented by this construction.

As still another example, U.S. Pat. No. 7,204,148 discloses a touch panel provided with a diffraction grating comprising a great number of inclined lines as a spurious wave scattering means outside reflective array regions, that is, closer to the edges of a substrate than reflective arrays (refer to page 5, FIG. 1, and FIG. 10). When spurious acoustic waves reach the inclined lines of the diffraction grating, they are diffused and attenuated such that they do not reach receiving side converters. The diffraction grating attenuates spurious waves which have propagated beyond the reflective arrays toward the edges of the substrate, and spurious waves that propagate from transmitting side converters to the receiving side converters outside the reflective arrays, that is, in the vicinity of the edges of the substrate.

The aforementioned touch panels are designed only to remove spurious waves that propagate from the reflective arrays thereof toward surfaces of the substrate where objects contact the substrate, that is, touch regions, by indirectly attenuating the spurious waves. In other words, the aforementioned touch panels cannot prevent spurious waves from propagating toward the touch regions from the reflective arrays.

Generally, acoustic waves reflected by reflective arrays toward touch regions are reflected by inclined lines of the reflective arrays at 90° angles with respect to the incident direction of the acoustic waves, that is, the arrangement direction of the inclined lines. However, not all of the acoustic waves are reflected at exactly 90° angles. In actuality, there are acoustic wave components which are reflected toward directions slightly shifted from 90°. If these components propagate into the touch regions as spurious waves, they become signal noise which is different from signals obtained from regular acoustic waves. This signal noise may cause so-called "coordinate skipping" phenomena, in which controllers cannot accurately recognize contact positions, where pointers such as fingers and pens contact the touch regions.

In order to prevent coordinate skipping phenomena, it is desirable to remove spurious wave components of acoustic waves which are reflected by reflective arrays toward touch regions within the reflective arrays when they are generated, such that they do not propagate toward the touch regions. The aforementioned known touch panels are capable of attenuating spurious waves that propagate from the reflective arrays in directions opposite the touch regions, and spurious waves which have passed through the touch regions, in the vicinity of the edges of the substrates. However, they are not capable of preventing spurious waves from being propagated from the reflective array regions.

BRIEF SUMMARY

The present invention has been developed in view of the foregoing circumstances. It is an object of the present invention to provide an acoustic wave type touch panel that prevents spurious waves from being reflected by reflective arrays toward a touch region, that accurately detects the positions of objects that contact the touch region, and is capable of preventing coordinate skipping.

An acoustic wave touch panel of the present invention has a substrate, reflective arrays, acoustic wave generating sections, detecting sections, and an array of micro reflectors. The substrate has a touch region. The reflective arrays are arranged in great number of inclined lines, each of which send and receive acoustic waves through the touch region, provided on the substrate. The acoustic wave generating sections, for generating acoustic waves that propagate toward the reflective arrays are provided on the substrate. The detecting sections which detect the acoustic waves that change according to contact positions of objects with respect to the touch region are provided on the substrate. The array of micro reflectors, which are shorter than the inclined lines, attenuate spurious waves generated by reflection of the acoustic waves by the reflective arrays and are provided between the inclined lines at least one end thereof.

BRIEF DESCRIPTION OF THE DRAWINGS

FIGS. 4A and 4B are diagrams for explaining a mechanism for generating acoustic waves, wherein FIG. 4A is a partial magnified sectional view of a mode converting element in the region indicated by IV of FIG. 1, and FIG. 4B is a magnified plan view of the mode converting element.

FIG. 5 is a diagram that illustrates the concept and the characteristics of the acoustic wave type touch panel of the present invention.

FIG. 6 is a graph that illustrates change in acoustic waves in a conventional touch panel not having micro reflectors.

FIG. 7 is a graph that illustrates change in acoustic waves in a touch panel having micro reflectors.

DETAILED DESCRIPTION OF THE EMBODIMENT(S)

Figure 1:
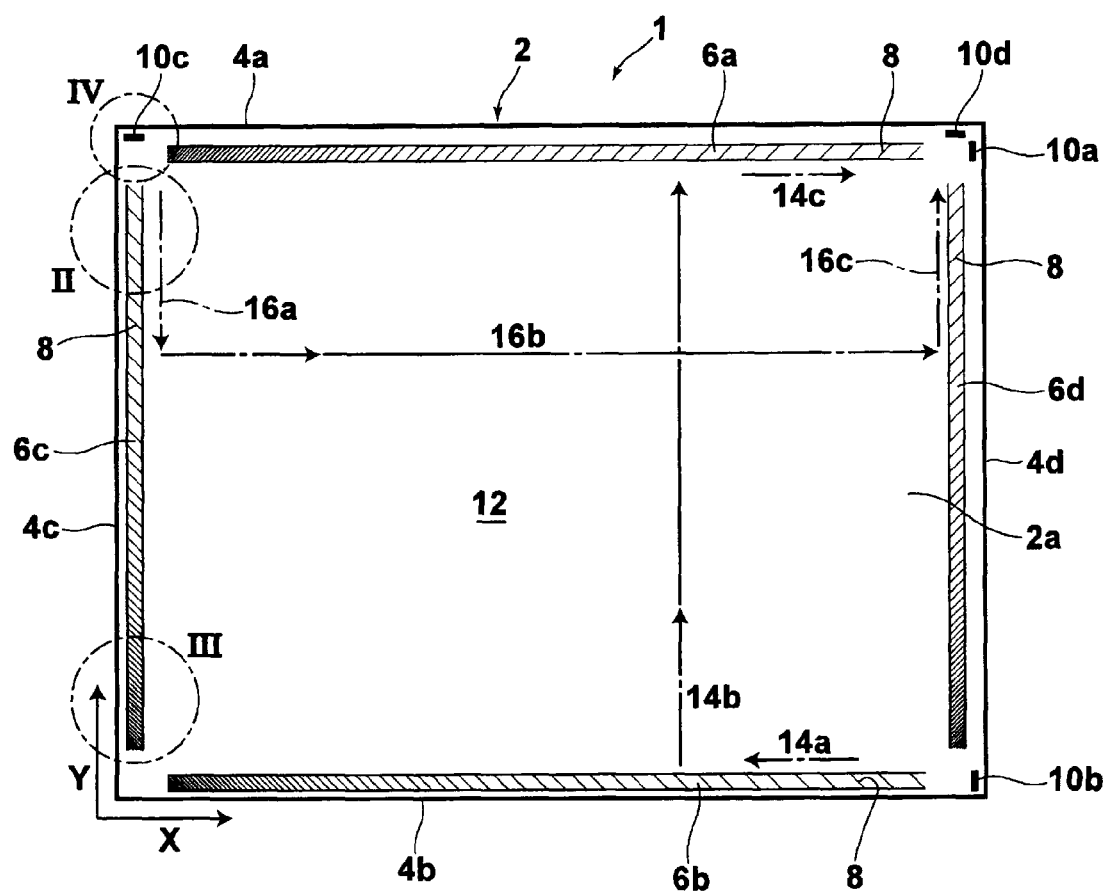
FIG. 1 is a front view that illustrates the entirety of an acoustic wave type touch panel according to an embodiment of the present invention.

Hereinafter, a preferred embodiment of the acoustic wave type touch panel (hereinafter, simply referred to as "touch panel") of the present invention will be described with reference to the attached drawings. FIG. 1 is a front view that illustrates the entirety of a touch panel 1 according to an embodiment of the present invention. As illustrated in FIG. 1, the touch panel 1 comprises a rectangular glass substrate 2 (hereinafter, simply referred to as "substrate"). Reflective arrays 6 (6a, 6b, 6c, and 6d) are formed substantially as a rectangle on the front surface 2a of the substrate 2 (the surface toward the viewer in the drawing of FIG. 1) to surround a touch region 12. The reflective arrays 6 (6a, 6b, 6c, and 6d) are formed in the vicinities of the four edges 4 (4a, 4b, 4c, and 4d) so as to be parallel therewith, respectively. Each reflective array 6 is constituted by a great number of ridges, that is, inclined lines 8, for reflecting surface acoustic waves. The inclined lines 8 are formed by printing fine lead glass powder in paste form onto the substrate 2 by screen printing or the like, then sintering.

Gratings, that is, mode converting elements 10b and 10c that function as acoustic wave emitters are provided on the front surface 2a of the substrate 2 at opposing corners thereof (refer to FIG. 4A). Transducers 30 are provided at positions corresponding to the mode converting elements 10b and 10c on the rear surface 2b of the substrate 2 (refer to FIG. 4A), but they are omitted from FIG. 1. The mode converting elements 10b and 10c are positioned so as to emit acoustic waves toward the reflective arrays 6b and 6c corresponding respectively thereto. Mode converting elements 10a and 10d that function as acoustic wave receivers are formed in the corner defined by edges 4a and 4d. The mode converting elements 10a and 10d respectively correspond to the reflective arrays 6a and 6d. The mode converting elements 10a, 10b, 10c, and 10d will be collectively referred to as "mode converting elements 10". The structure of the mode converting elements 10 will be described later. The transducers 30 provided on the rear surface 2b of the substrate 2 will also be described later.

Acoustic waves propagate along the touch region 12 of the front surface 2a of the substrate 2. The basic principle of acoustic wave propagation in the touch panel 1 will be described briefly. Acoustic waves which have propagated from the emitting side mode converting element 10b to the reflective array 6b reach the receiving side mode converting element 10a via paths 14a, 14b, and 14c, for example. The path 14b that crosses the touch region 12 is merely an example, and in actuality, a great number of paths parallel to the path 14b are formed across the touch region 12 throughout the entire length of the reflective array 6b. That is, each inclined line 8 of the reflective array 6b is formed at approximately a 45° angle, so as to reflect a portion (approximately 0.5% to 1%) of the acoustic waves that pass through the path 14a, toward the reflective array 6a. The inclined lines 8 of the reflective array 6a that faces the reflective array 6b are formed at approximately 45° angles so as to propagate acoustic waves that enter the reflective array 6a along the path 14b toward the mode converting element 10a.

The inclined lines 8 of the reflective array 6b are arranged such that the intervals therebetween are comparatively greater at positions closer to the mode converting element 10b and comparatively smaller at positions farther away therefrom. This configuration is adopted such that the intensities of the acoustic waves that propagate along the touch region 12 parallel to the path 14b become uniform. The intervals between the lines 8 are integer multiples of the wavelength of the acoustic waves. The arrangement density of the inclined lines 8 increases exponentially as they become farther away from the mode converting element 10b. Similarly, the inclined lines 8 of the reflective array 6a are arranged such that the intervals therebetween become greater at positions closer to the mode converting element 10a. The reflective array 6b and the reflective array 6a are shaped substantially symmetrically in this manner.

Similarly, acoustic waves which have propagated from the emitting side mode converting element 10c to the reflective array 6c reach the receiving side mode converting element 10d via paths 16a, 16b, and 16c, for example. The inclined lines 8 of the reflective array 6c and the reflective array 6d are provided in a symmetrical arrangement, in the same manner as those of the reflective array 6a and the reflective array 6b. Note that the paths that cross the touch region 12 in directions parallel to the x direction and the Y direction will be collectively referred to as "paths 16" and "paths 14", respectively. In the case that an object such as a finger contacts the substrate within the touch region 12, signal changes within paths from among the paths 14 and 16 which are blocked by the object are detected by a receiving side transducer (not shown). Thereafter, the blocked position, that is, the contact position of the object, is judged.

Figure 2:
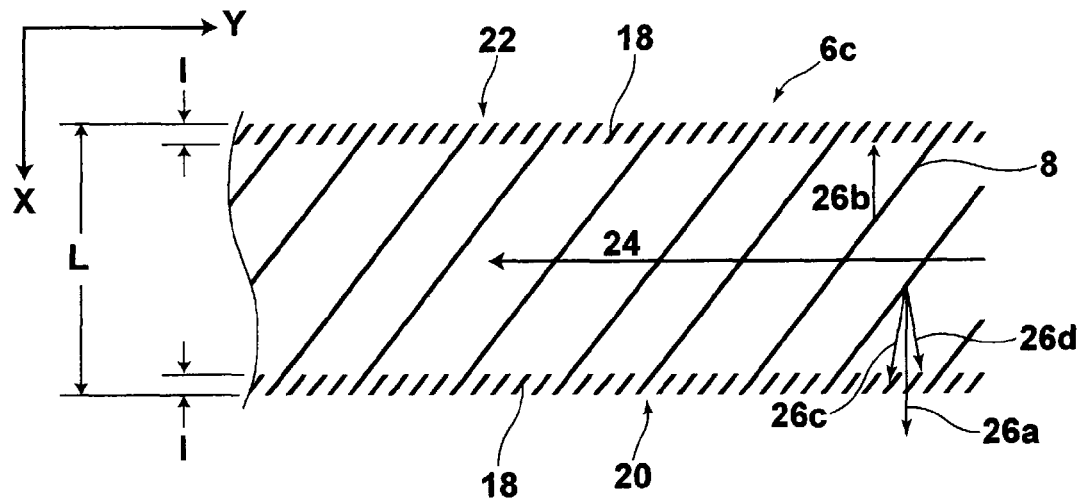
FIG. 2 is a partial magnified view of reflective arrays in the region indicated by II of FIG. 1.
Figure 3:
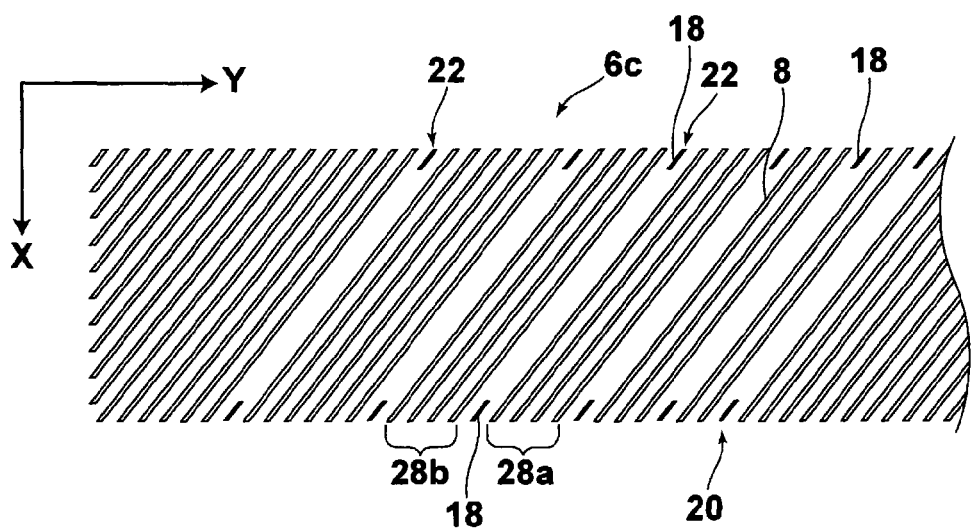
FIG. 3 is a partial magnified view of reflective arrays in the region indicated by III of FIG. 1.

Next, the reflective arrays 6 will be described in further detail with combined reference to FIG. 2 and FIG. 3. FIG. 2 and FIG. 3 are partial magnified views of the reflective array 6c at the regions indicated by II and III in FIG. 1, respectively, rotated 90° in the clockwise direction. FIG. 2 and FIG. 3 clearly illustrate that the intervals between the inclined lines 8 are wide in region II, and narrow in region III, as described previously. What is important here is that rows 20 and 22 of micro reflectors 18 (spurious wave attenuating portions) are formed along the longitudinal edges of the rectangular region of the reflective array 6c, that is, parallel to the Y direction. The micro reflectors 18 are provided within the region of the reflective array 6c at both sides thereof, that is, the inner side toward the touch region 12 and the outer side toward the edge 4c. The micro reflectors 18 are inclined at the same angle as the inclined lines 8, and are formed by a method such as screen printing, in the same manner as the inclined lines 8. The dimension 1 of the micro reflectors 18 along the X direction is set to 0.5 mm, for example. Meanwhile, the dimension L of the inclined lines 8 along the X direction is set to 6 mm, for example. The micro reflectors 18 can be formed simultaneously with the inclined lines 8 using the same method. Therefore, the touch panel 1 can be produced without adding new materials or manufacturing steps.

In region II, where the intervals between the inclined lines 8 are wide, three to four pairs of micro reflectors 18 are arranged between the inclined lines 8 at intervals equal to the wavelength of acoustic waves, as illustrated in FIG. 2. Note that the intervals need not necessary be exactly equal to the wavelength of the acoustic waves. The intervals may be slightly different from the wavelength, twice the wavelength, or the micro reflectors 18 may be partially omitted. On the other hand, in region III, where the intervals between the inclined lines 8 are narrow, single pairs of micro reflectors 18 are arranged between groups of a plurality of inclined lines 8, such as groups 28a and 28b, as illustrated in FIG. 3. Many spurious waves are generated when acoustic waves are reflected in the region where the inclined lines 8 are sparse, because the intervals therebetween are wide. Accordingly, the plurality of pairs of micro reflectors 18 are provided between adjacent inclined lines 8 in the sparse region, to attenuate the spurious waves. The micro reflectors 18 have been described with the reflective array 6c as an example. The other reflective arrays 6a, 6b, and 6d are configured similarly. That is, the micro reflectors 18 are provided on both sides along the longitudinal edges of each reflective array 6.

Next, the operation of the micro reflectors 18 will be described. As illustrated in FIG. 2, 99% to 99.5% of an acoustic wave that propagates from the mode converting element 10c in the direction indicated by arrow 24 passes through each inclined line 8 of the reflective array 6a. In other words, the acoustic wave is reduced by 0.5% to 1% by each inclined line 8 when passing therethrough. As illustrated in FIG. 2, an acoustic wave, which is reflected at a 90° angle with respect to the arrow 24, propagates inward toward the touch panel 12 as a component 26a. However, a portion of the acoustic wave is reflected as a component 26b (spurious wave) that propagates in a direction opposite that of the component 26a. In addition, there are other inwardly directed components 26c and 26d (spurious waves), which are reflected at oblique and acute angles. The components 26c and 26d of the acoustic wave are reflected by the micro reflectors 18 before entering the touch region 12 from the reflective array 6c, or are reduced while passing through the micro reflectors 18. The components 26c and 26d which are reflected by the micro reflectors 18 are repetitively reflected among the micro reflectors 18, such that the intensities thereof are attenuated to a level that does not cause any problems. The outwardly directed component 26b, which is also a spurious wave, is repetitively reflected among the micro reflectors 18 such that the intensity thereof is attenuated, in a similar manner. The intensities of spurious waves that propagate outward from the region of the reflective array 6c are also attenuated to a level that does not cause any problems. Accordingly, spurious waves are attenuated to levels that do not cause any problems, within acoustic waves which are reflected by the inclined lines 8 within the region of the reflective array 6c and propagate to the touch region 12.

In this manner, spurious waves are greatly attenuated by providing the micro reflectors 18 both at the inner side and the outer side of each reflective array 6. This advantageous effect is particularly conspicuous in the case that the micro reflectors 18 are provided at the inner side toward the touch region 12, because spurious waves that propagate toward the touch region 12 are directly removed.

Where the inclined lines 8 are provided in a highly dense manner, single pairs of micro reflectors 18 are arranged between groups of a plurality of inclined lines 8, such as groups 28a and 28b, as illustrated in FIG. 3. The function of the micro reflectors 18 in these dense regions are the same as that of the micro reflectors 18 in the sparse regions described above.

As illustrated in FIG. 2 and FIG. 3, it is important for the arrangement intervals between the inclined lines 8 and the micro reflectors 18 to be integer multiples of the wavelength of acoustic waves. In the present embodiment, the micro reflectors 18 are arranged with one wavelength intervals therebetween. Thereby, acoustic waves which are reflected at angles other than 90° (spurious waves) due to the diffractive nature thereof are diffused and cancel each other out, resulting in minimization of the intensities of the spurious waves.

Next, the structure for generating acoustic waves will be described with reference to FIGS. 4A and 4B. FIGS. 4A and 4B are diagrams for explaining a mechanism for generating acoustic waves, wherein FIG. 4A is a partial magnified sectional view of the mode converting element 10c in the region indicated by IV of FIG. 1, and FIG. 4B is a magnified plan view of the mode converting element 10c. As illustrated in FIG. 4A, the mode converting element 10c is constituted by a plurality of low parallel ridges 11 which are formed on the front surface 2a of the substrate 2. The transducer 30 is mounted on the rear surface 2b of the substrate 2 at a position corresponding to the mode converting element 10c. Bulk waves which are generated by the transducer 30 pass through the substrate 2, are converted into acoustic waves by the mode converting element 10c, and propagate toward the reflective array 6c. The mode converting element 10c and the transducer 30 are collectively referred to as an "acoustic wave generating section". The other emitting side mode converting element 10b (refer to FIG. 1) and the two receiving side mode converting elements 10a and 10d are of the same structure. The transducers on the receiving side are not bulk wave generating means, but acoustic wave detecting means. The receiving side mode converting elements 10a and 10d and the transducers are collectively referred to as a "detecting section".

Next, the characteristic features of the present invention will be described with reference to FIG. 5. FIG. 5 is a diagram that illustrates the concept and the characteristics of the acoustic wave type touch panel 1 of the present invention. As illustrated in FIG. 5, the amount of a component 26a, which is an acoustic wave that propagates from the region of the reflective array 6c at a 90° angle, is high. The component 26a is a functional component which can be utilized effectively. The reason why the amount of the component 26a is high is because the amount of spurious waves 31 and 32, which are acoustic waves reflected by the reflective array 6c at angles other than 90.degree., is extremely low, therefore precluding interference of the spurious waves 31 and 32 with the component 26a. In contrast, the amount of a component 26a', which is an acoustic wave that propagates from the reflective array 6c at a 90° angle in a conventional design without the micro reflectors 18 is low. This is because the amount of spurious waves 31' and 32' that interferes with the component 26a is high, thereby reducing the amount of the effectively usable component 26a'. The touch panel 1 of the present invention reduces the amount of spurious waves 31 and 32 at the stage where acoustic waves propagate from the reflective array 6c, as described previously. Therefore, functional acoustic waves propagate along the touch region 12.

Changes in acoustic waves when a finger, for example, contacts the touch region 12 in both cases described above will be described with reference to FIG. 6 and FIG. 7. FIG. 6 is a graph that illustrates change in acoustic waves in a conventional touch panel not having micro reflectors. FIG. 7 is a graph that illustrates change in acoustic waves in a touch panel having micro reflectors. In each graph, the horizontal axis represents passage of time in the Y direction, and the vertical axis represents intensities of acoustic waves. The units are 10 microseconds and 500 mV, respectively.

A case will be described in which a finger is placed on the contact position indicated by 34 in the touch panel 1 of FIG. 5. In a conventional touch panel not equipped with the micro reflectors 18, the contact position appears as a depression 36 (refer to FIG. 6) in the graph. The depression indicates that the intensity of acoustic waves is decreased at this position, because the finger blocks the acoustic waves. If the finger is moved in the direction indicated by arrow 38 along the X direction from contact position 36 to a contact position 40, the position of the finger in the Y direction does not change, and therefore no change should occur in the other parts of the curve of the graph of FIG. 6. However, another depression 37 appears, after a time lag. This indicates that the finger has been erroneously judged to have moved in the Y direction. This coordinate skipping phenomenon occurs because the micro reflectors 18 are not provided in the conventional touch panel. In other words, acoustic waves (spurious waves) which are reflected and scattered at angles other than 90° by the reflective array 6c, are blocked by the finger at contact position 40, then received by the transducer of the detecting section. As a result, a position, which is different from the position that the finger has actually contacted, is input as the contact position to a device that utilizes the touch panel.

In the touch panel 1 of the present invention, the amount of spurious waves that propagate from the reflective array 6c is greatly reduced by the micro reflectors 18. Therefore, only the depression 42 appears when a finger is at contact position 34, and no additional depressions appear when the finger is moved in the X direction. That is, no influence due to spurious waves can be observed. Note that in FIG. 6 and FIG. 7, the curves 44 and 46 above the depressions 36, 37, and 42 represent the output of transducers when no object is in contact with the touch region.

An embodiment of the present invention has been described above. However, the present invention is not limited to the above embodiment, and various changes and modifications are possible. For example, gratings were utilized as the mode converting elements in the above embodiment. Alternatively, other converters, such as wedge type converters (triangular pyramid type converters) and IDT type converters may be employed.

In addition, in the above embodiment, two pairs of opposing reflective arrays were utilized to surround the touch region 12. However, the present invention is not limited to such a configuration. For example, in the case that the receiving side reflective arrays 6 are omitted and acoustic waves are reflected at a 180° angle at an edge 4 of the substrate 2, emission and reception of the acoustic waves can be accomplished with a single reflective array. Accordingly, in this case, two reflective arrays 6 provided perpendicular to each other can define the touch region 12. Alternatively, in the case that the contact position is limited to data related only to a single axis, a uniaxial touch region 12 may be configured for either the X direction or the Y direction. The concept of the present invention can be effectively applied to these modified touch panels.

Further, in the above embodiment, the micro reflectors 18 were formed at both sides of the region of each reflective array 6. Alternatively, the micro reflectors 18 may be formed only at one side of the reflective arrays 6. It is particularly effective for the micro reflectors 18 to be formed at the side toward the touch region in the emitting side reflective arrays 6b and 6c. It is effective for the micro reflectors 18 to be formed at the side toward the edges 4a and 4d of the receiving side reflective arrays 6a and 6d, in order to reduce the amount of spurious waves reflected by the edges 4a and 4d. It goes without saying that these arrangements of the micro reflectors 18 and combinations thereof can be set as desired.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An acoustic wave type touch panel, comprising:
a substrate having a touch region;
reflective arrays arranged in a great number of inclined lines, at least one of which sends and at least one of which receives acoustic waves through the touch region, provided on the substrate;
an acoustic wave generating section, generating acoustic waves that propagate toward the reflective arrays, provided on the substrate;
a detecting section which detects the acoustic waves that change according to contact positions of objects with respect to the touch region, provided on the substrate; and an array of micro reflectors, each of the micro reflectors being shorter than the inclined lines and within a region formed by one of the reflective arrays, for attenuating spurious waves generated by reflection of the acoustic waves by the reflective arrays, at least one of said micro reflectors provided within the region between at least two of the inclined lines of said one of the reflective arrays, each of said micro reflectors formed at a side of said region and each of said micro reflectors not being located at the center of said inclined lines.

2. An acoustic wave type touch panel as defined in claim 1, wherein:
the inclined lines of the reflective arrays are arranged such that the intervals therebetween are equal to integer multiples of the wavelength of the acoustic waves;
the inclined lines of the reflective arrays are arranged such that the intervals therebetween are comparatively greater at the sides of the reflective arrays closer to the acoustic wave generating section or the detecting section and comparatively smaller as the positions of the lines becomes farther away from the acoustic wave generating section or the detecting section; and
the micro reflectors are arranged between the inclined lines such that the intervals therebetween are substantially equal to the wavelength of the acoustic waves.

3. An acoustic wave type touch panel as defined in claim 1, wherein:
the acoustic wave generating section comprises transducers.

4. An acoustic wave type touch panel as defined in claim 1, wherein:
the detecting section comprises mode converting elements.

5. An acoustic wave type touch panel as defined in claim 1, wherein:
the micro reflectors are formed along with the inclined lines of the reflective arrays by printing.

6. An acoustic wave type touch panel as defined in claim 2, wherein:
the acoustic wave generating section comprises transducers.

7. An acoustic wave type touch panel as defined in claim 2, wherein:
the detecting section comprises mode converting elements.

8. An acoustic wave type touch panel as defined in claim 2, wherein:
the micro reflectors are formed along with the inclined lines of the reflective arrays by printing.

9. An acoustic wave type touch panel as defined in claim 3, wherein:
the detecting section comprises mode converting elements.

10. An acoustic wave type touch panel as defined in claim 3, wherein:
the micro reflectors are formed along with the inclined lines of the reflective arrays by printing.

11. An acoustic wave type touch panel as defined in claim 4, wherein:
the micro reflectors are formed along with the inclined lines of the reflective arrays by printing.

12. An acoustic wave type touch panel as defined in claim 6, wherein:
the detecting section comprises mode converting elements.

13. An acoustic wave type touch panel as defined in claim 6, wherein:
the micro reflectors are formed along with the inclined lines of the reflective arrays by printing.

14. An acoustic wave type touch panel as defined in claim 7, wherein:
the micro reflectors are formed along with the inclined lines of the reflective arrays by printing.

15. An acoustic wave type touch panel as defined in claim 9, wherein:
the micro reflectors are formed along with the inclined lines of the reflective arrays by printing.

16. An acoustic wave type touch panel as defined in claim 12, wherein:
the micro reflectors are formed along with the inclined lines of the reflective arrays by printing.

17. An acoustic wave type touch panel as defined in claim 1, wherein:
a plurality of said micro reflectors are provided between at least two of the inclined lines.

18. An acoustic wave type touch panel as defined in claim 1, wherein:
said micro reflectors are formed at the side of said region, the side of said region being toward the touch region when said micro reflectors are within emitting reflective arrays.

19. An acoustic wave type touch panel as defined in claim 1, wherein:
said micro reflectors are formed at the side of said region, the side of said region being toward an edge of the substrate when said micro reflectors are within receiving reflective arrays.

20. An acoustic wave type touch panel as defined in claim 1, wherein:
said micro reflectors are formed at two sides of said region, the side of said region comprising one of said two sides.

* * * * *